(12) United States Patent
Nakazawa et al.

(10) Patent No.: US 6,657,850 B2
(45) Date of Patent: *Dec. 2, 2003

(54) ELECTRIC DOUBLE LAYER CAPACITOR AND METHOD OF FORMING THE SAME

(75) Inventors: Yutaka Nakazawa, Minato-ku (JP); Koji Sakata, Minato-ku (JP); Ryuuichi Kasahara, Minato-ku (JP)

(73) Assignee: NEC Tokin Corporation, Miyagi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/100,136

(22) Filed: Mar. 19, 2002

(65) Prior Publication Data

US 2002/0191369 A1 Dec. 19, 2002

(30) Foreign Application Priority Data

Mar. 19, 2001 (JP) ........................................ 2001-079220

(51) Int. Cl.[7] .................................................. H01G 9/00
(52) U.S. Cl. ....................................... 361/502; 361/503
(58) Field of Search ................................ 361/502, 503, 361/517, 518, 519, 520

(56) References Cited

U.S. PATENT DOCUMENTS

| | | | | |
|---|---|---|---|---|
| 4,488,203 A | * | 12/1984 | Muranaka et al. | 361/502 |
| 4,803,597 A | * | 2/1989 | Watanabe et al. | 361/502 |
| 5,168,433 A | * | 12/1992 | Mukouyama et al. | 361/502 |
| 6,392,868 B2 | * | 5/2002 | Ohya et al. | 361/502 |
| 2002/0006546 A1 | | 1/2002 | Sakata et al. | |
| 2002/0131232 A1 | * | 9/2002 | Sakata et al. | 361/502 |

FOREIGN PATENT DOCUMENTS

| JP | 60-144928 | | 7/1985 | |
|---|---|---|---|---|
| JP | 10-4033 | * | 1/1998 | H01G/9/016 |

* cited by examiner

Primary Examiner—Dean A. Reichard
Assistant Examiner—Eric Thomas
(74) Attorney, Agent, or Firm—Young & Thompson (57) ABSTRACT

An electrical double layer capacitor includes a capacitor cell structure comprising: a separator; polarization electrodes; collectors; and a gasket, wherein at least a part of at least either one of the collectors and the gasket has a gas permeability coefficient of at least $4.0E-12[m^3/(m^2 \cdot S \cdot Pa)]$.

38 Claims, 6 Drawing Sheets

ELECTRIC DOUBLE LAYER CAPACITOR AND METHOD OF FORMING THE SAME

BACKGROUND OF THE INVENTION

1. Field of the Invention

The present invention relates to an electric double layer capacitor and a method of forming the same.

2. Description of the Related Art

In recent years, the electric double layer capacitor has been attractive for further decreases in size and further increases in capacity. For example, the electric double layer capacitor in combination with a lead storage battery has been investigated for a new application to provide driving power to a cell motor of an automobile. The electric double layer capacitor in combination with a solar battery has also been investigated for another new application to provide auxiliary power to a cell motor of an automobile.

The electric double layer capacitor comprises a cell structure which includes a separator, a pair of polarization electrodes, a pair of collectors, a gasket and an electrolytic solution. The separator comprises a porous sheet which is interposed between the paired polarization electrodes. The polarization electrodes have a plate-shape. The paired polarization electrodes sandwiching the separator are interposed between the paired collectors. The collectors have a sheet-shape. The gasket is formed in a frame so that the frame-shaped gasket surrounds a periphery of the layered structure which comprises the separator, the polarization electrodes, and the collectors.

Japanese laid-open patent publication No. 60-144928 discloses that the cell is subjected to an aging process in an atmosphere at a temperature of 70–120° C. under application of a voltage for one or a few hours, which voltage level is not higher than an electrolysis voltage of the electrolytic solution and is not lower than a voltage level obtained by a division of a working voltage of the electric double layer capacitor comprising laminations of the cells by the number of the laminations of the cells.

This aging process is carried out in order to identify and remove defective products and stabilize the electrical characteristics of the electric double layer capacitor. The first issue of identifying and removing the defective product will be described. Upon application of a voltage to the cell, a reaction is caused between carbon of an activated carbon and oxygen in the electrolytic solution, wherein the activated carbon forms the polarization electrodes, whereby a carbon dioxide gas or a carbon monoxide gas is generated by this reaction. This generation of the gas increases a gap between the separator and the polarization electrodes. The increase of the gap may increase an equivalent series resistance and allow a leakage of the electrolytic solution. For those reasons, the above loads are intentionally applied to the cell and defective products are withdrawn.

The above described aging process is effective to remove the defective products but does not prevent the production of the defective product nor is it effective to improve the yield.

In the above circumstances, the development of a novel electric double layer capacitor and method of forming the same free from the above problems is desirable.

SUMMARY OF THE INVENTION

Accordingly, it is an object of the present invention to provide a novel electric double layer capacitor free from the above problems.

It is a further object of the present invention to provide a novel electric double layer capacitor which is suitable for improvement in the yield.

It is a still further object of the present invention to provide a novel method of forming an electric double layer capacitor free from the above problems.

It is yet a further object of the present invention to provide a novel method of forming an electric double layer capacitor which is suitable for improvement in the yield.

The present invention provides an electrical double layer capacitor including a capacitor cell structure comprising: a separator; polarization electrodes; collectors; and a gasket, wherein at least a part of at least either one of the collectors and the gasket has a gas permeability coefficient of at least $4.0E\text{-}12[m^3/(m^2 \cdot S \cdot Pa)]$.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DETAILED DESCRIPTION OF THE PREFERRED EMBODIMENTS

A first aspect of the present invention is a capacitor cell structure comprising: a separator; polarization electrodes; collectors; and a gasket, wherein at least a part of at least either one of the collectors and the gasket has a gas permeability coefficient of at least $4.0E\text{-}12[m^3/(m^2 \cdot S \cdot Pa)]$.

It is preferable that the collectors comprises a material having the gas permeability coefficient of at least $4.0E\text{-}12 [m^3/(m^2 \cdot S \cdot Pa)]$.

It is also preferable that the material of the collectors comprises an electrically conductive styrene-ethylene-butylene-styrene co-polymer including dispersion of carbon.

It is also preferable that the gasket comprises a material having the gas permeability coefficient of at least $4.0E\text{-}12 [m^3/(m^2 \cdot S \cdot Pa)]$. It is further preferable that the material of the gasket comprises an electrically conductive styrene-ethylene-butylene-styrene co-polymer including dispersion of carbon.

It is also preferable that both the collectors and the gasket comprise a same material having the gas permeability coefficient of at least $4.0E\text{-}12[m^3/(m^2 \cdot S \cdot Pa)]$. It is further preferable that the same material comprises an electrically conductive styrene-ethylene-butylene-styrene co-polymer including dispersion of carbon.

It is also preferable that the gas permeability coefficient is at most $9.0E-12[m^3/(m^2 \cdot S \cdot Pa)]$.

It is also preferable that the gasket comprises a triple layered structure including side layers and a center layer which is interposed between the side layers and the center layer surrounds a periphery of the separator. It is further preferable that each of the side layers surrounds a periphery of the polarization electrode. It is further preferable that each of the side layers surrounds both respective peripheries of the polarization electrode and the collector.

A second aspect of the present invention is an electric double layer capacitor comprising: a plurality of stacked cell structures, each of the cell structure further comprises a separator; polarization electrodes collectors; and a gasket, and a package film which packages the stacked cell structures, wherein at least a part of at least either one of the collectors and the gasket has a gas permeability coefficient of at least $4.0E-12[m^3/(m^2 \cdot S \cdot Pa)]$.

It is preferable that the collectors comprises a material having the gas permeability coefficient of at least $4.0E-12 [m^3/(m^2 \cdot S \cdot Pa)]$. It is further preferable that the material of the collectors comprises an electrically conductive styrene-ethylene-butylene-styrene co-polymer including dispersion of carbon.

It is also preferable that the gasket comprises a material having the gas permeability coefficient of at least $4.0E-12 [m^3/(m^2 \cdot S \cdot Pa)]$. It is further preferable that the material of the gasket comprises an electrically conductive styrene-ethylene-butylene-styrene co-polymer including dispersion of carbon.

It is also preferable that both the collectors and the gasket comprise a same material having the gas permeability coefficient of at least $4.0E-12[m^3/(m^2 \cdot S \cdot Pa)]$. It is further preferable that the same material comprises an electrically conductive styrene-ethylene-butylene-styrene co-polymer including dispersion of carbon.

It is also preferable that the gas permeability coefficient is at most $9.0E-12[m^3/(m^2 \cdot S \cdot Pa)]$.

It is also preferable that the gasket comprises a triple layered structure including side layers and a center layer which is interposed between the side layers and the center layer surrounds a periphery of the separator. It is further preferable that each of the side layers surrounds a periphery of the polarization electrode.

It is also preferable that each of the side layers surrounds both respective peripheries of the polarization electrode and the collector.

It is also preferable that the package film comprises an electrically insulative thermoplastic resin film.

A third aspect of the present invention is an electric double layer capacitor comprising: a plurality of stacked cell structures, each of the cell structure further comprises: a separator; polarization electrodes collectors; and a gasket, and an outer case which contains the stacked cell structures, wherein at least a part of at least either one of the collectors and the gasket has a gas permeability coefficient of at least $4.0E-12[m^3/(m^2 \cdot S \cdot Pa)]$.

It is also preferable that the collectors comprises a material having the gas permeability coefficient of at least $4.0E-12[m^3/(m^2 \cdot S \cdot Pa)]$. It is also preferable that the material of the collectors comprises an electricially conductive styrene-ethylene-butylene-styrene co-polymer including dispersion of carbon.

It is also preferable that the gasket comprises a material having the gas permeability coefficient of at least $4.0E-12$ $[m^3/(m^2 \cdot S \cdot Pa)]$. It is further preferable that the material of the gasket comprises an electrically conductive styrene-ethylene-butylene-styrene co-polymer including dispersion of carbon.

It is also preferable that both the collectors and the gasket comprise a same material having the gas permeability coefficient of at least $4.0E-12[m^3/(m^2 \cdot S \cdot Pa)]$. It is further preferable that the same material comprises an electrically conductive styrene-ethylene-butylene-styrene co-polymer including dispersion of carbon.

It is also preferable that the gas permeability coefficient is at most $9.0E-12[m^3/(m^2 \cdot S \cdot Pa)]$.

It is also preferable that the gasket comprises a triple layered structure including side layers and a center layer which is interposed between the side layers and the center layer surrounds a periphery of the separator. It is further preferable that each of the side layers surrounds a periphery of the polarization electrode. It is also preferable that each of the side Layers surrounds both respective peripheries of the polarization electrode and the collector.

It is also preferable that the outer case has an outside surface which is coated with an electrically insulative resin film.

It is also preferable that the outer case has an inside surface which is coated with an electrically insulative thermoplastic resin film.

It is also preferable to further comprise a package film which packages the stacked cell structure. It is also preferable that the package film comprises an electrically insulative thermoplastic resin film.

In accordance with the present invention, the electric double layer capacitor comprises a cell structure which includes a separator, a pair of polarization electrodes, a pair of collectors, a gasket and an electrolytic solution. The separator comprises a porous sheet which is interposed between the paired polarization electrodes. The polarization electrodes have a plate-shape. The paired polarization electrodes sandwiching the separator are interposed between the paired collectors. The collectors have a sheet-shape. The gasket is formed in a frame so that the frame-shaped gasket surrounds a periphery of the layered structure which comprises the separator, the polarization electrodes, and the collectors.

It is important for the present invention that at least a part of either one of the collectors and the gasket has a gas permeability coefficient of at least $4.0E-12[m^3/(m^2 \cdot S \cdot Pa)]$. The cell receives an application of a voltage which is not higher than an electrolysis voltage of the electrolytic solution and which is not lower than a voltage level obtained by a division of a working voltage of the electric double layer capacitor comprising laminations of the cells by the number of the laminations of the cells. Upon application of this voltage to the cell, a reaction is caused between carbon of an activated carbon and oxygen in the electrolytic solution wherein the activated carbon forms the polarization electrodes, whereby a carbon dioxide gas or a carbon monoxide gas is generated by this reaction.

The generated gas is, however, permeable through at least one of the collectors and the gasket, which has the gas permeability coefficient of at least $4.0E-12$ $[m^3/(m^2 \cdot S \cdot Pa)]$, whereby no accumulation of the gas in the cell is caused. This prevents any increase in the equivalent series resistance and any leakage of the electrolytic solution. For those reasons, at least one of the above collectors and gasket, which has the gas permeability coefficient of at least $4.0E-12$ $[m^3/(m^2 \cdot S \cdot Pa)]$, is effective to prevent the defective product and improve the yield.

If the collectors comprise the above-described highly gas-permeable material having the gas permeability coefficient of at least $4.0E-12[m^3/(m^2 \cdot S \cdot Pa)]$, then an electrically conductive styrene-ethylene-butylene-styrene co-polymer including dispersion of carbon is one of the preferable and available materials.

If the gasket comprises the above-described highly gas-permeable material having the gas permeability coefficient of at least $4.0E-12[m^3/(m^2 \cdot S \cdot Pa)]$, then also the electrically conductive styrene-ethylene-butylene-styrene co-polymer is one of the preferable and available materials.

The gasket may optionally comprise a triple layered structure having a staking direction parallel to a thickness direction of the separator, wherein a center layer of the triple layered structure of the gasket surrounds a periphery of said separator, so that it is unnecessary that both side layers of the triple layered structure of the gasket sandwiching the center layer extend to a peripheral region of the separator. This means it unnecessary that the both side layers of the triple layered structure of the gasket have a sufficiently large deformation margin. This allows narrowing the gap between the separator and the polarization electrodes. It is, of course, unnecessary that a high pressure is applied to the both side layers of the triple layered structure of the gasket for causing a large deformation of the side layers. This prevents any leakage of the electrolytic solution to the layered structure of the cell, whereby preventing a thermal fusion bonding between respective layers of the cell. This allows both the suppression of the equivalent series resistance and the prevention of the leakage of the electrolytic solution.

First Embodiment

Figure 1:
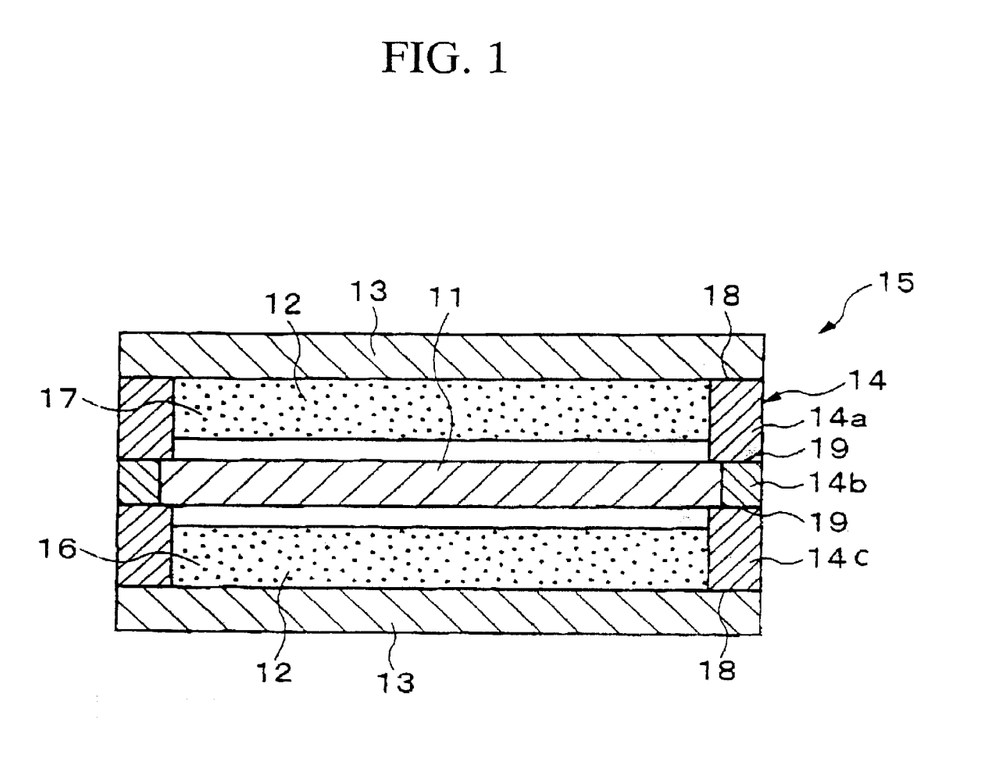
FIG. 1 is a cross sectional elevation view of a cell structure for an electric double layer capacitor in a first embodiment in accordance with the present invention.
Figure 2:
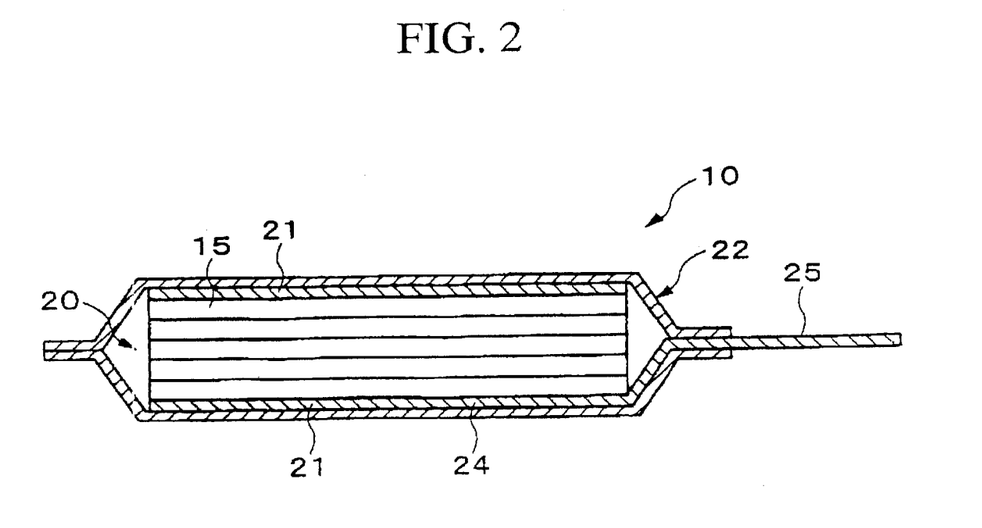
FIG. 2 is a cross sectional elevation view of an electric double layer capacitor having the cell structure of FIG. 1.

A first embodiment according to the present invention will be described in detail with reference to the drawings. FIG. 1 is a cross sectional elevation view of a cell structure for an electric double layer capacitor in a first embodiment in accordance with the present invention. FIG. 2 is a cross sectional elevation view of an electric double layer capacitor having the cell structure of FIG. 1.

An electric double layer capacitor 10 has a cell structure 15. The cell structure 15 comprises a separator 11, a pair of polarization electrodes 12, a pair of collector electrodes 13, and a gasket 14. The separator 11 has a sheet-shape and has a first face and a second face opposite to the first face. The polarization electrodes 12 comprise flat plates. The polarization electrodes 12 are provided adjacent to the first and second faces of the separator 11, but separated by a small gap from the first and second faces of the separator 11. The polarization electrodes 12 extend parallel to the separator 11 in both sides of the separator, so that the separator 11 is interposed between the polarization electrodes 12. Each of the polarization electrodes 12 has a first face toward the separator 11 and a second face opposite to the first face.

The collectors 13 have a sheet-shape. Each of the collectors 13 is provided adjacent to the second face of each of the polarization electrodes 12, so that the collectors 13 sandwich the polarization electrodes 12, whilst the polarization electrodes 12 sandwiching the separator 11 are interposed between the collectors 13. The collectors 13 extend parallel to the polarization electrodes 12 and the separator 11 and are in contact with the second faces of the polarization electrodes 12. The separator 11, the polarization electrodes 12 and the collectors 13 form a five-layered lamination structure, wherein a direction of the lamination is parallel to a thickness direction of the separator 11, the polarization electrodes 12 and the collectors 13.

The gasket 14 has a frame-shape. The gasket 14 is provided surrounding peripheries of the separator 11 and the polarization electrodes 12. The gasket 14 is interposed between the collectors 13 and sandwiched by peripheral regions of the collectors 13. Opposite faces of the gasket 14 are in contact tightly with the peripheral regions of the collectors 13, so that the cell structure containing an electrolytic solution is securely sealed by the gasket 14 under a reduced pressure.

The cell structure 15 will further be described in more details. The separator 11 may optionally comprise a square-shaped porous film having an electrical non-conductivity and an ion permeability. For example, a polypropylene resin based porous film having a thickness of 20 micrometers may be available as the separator 11.

The paired polarization electrodes 12 may optically have the same shape of squared flat plate. The polarization electrodes 12 may optionally include activated carbons. In this case, the polarization electrodes 12 may be formed by mixing powdered activated carbons with any available binder material and any available solvent. The paired polarization electrodes 12 with the uniform shape are placed parallel to the separator 11. Each of the polarization electrodes 12 may optionally have a thickness of 50 micrometers and a 3 cm×3 cm square size.

The paired collectors 13 may optionally have a uniform shape of the squared sheet. Each of the paired collectors 13 may optionally comprise an electrically conductive film, for example, an olefin-based resin with dispersion of carbon. The paired collectors 13 comprises a material having a gas permeability coefficient in the range of $4.0E-12[m^3/(m^2 \cdot S \cdot Pa)]$ to $9.0E-12[m^3/(m^2 \cdot S \cdot Pa)]$. This gas permeability coefficient is $CO_2$ gas permeability coefficient. The paired collectors 13 may optionally comprise an electrically conductive styrene-ethylene-butylene-styrene co-polymer including dispersion of carbon.

The polarization electrodes 12 may be formed by a printing method in contact tightly with the collectors 11. Namely, the mixture of the activated carbon with the binder material and the solvent may be printed in square shape on each of the collectors 13.

The gasket 14 has a squared frame-shape, which comprises a triple-layered structure. The triple-layered structure comprises first, second and third layers 14a, 14b and 14c which are laminated in a thickness direction of the separator 11. The second layer 14b is a center layer sandwiched between the first and third layers 14a and 14c. Each of the first, second and third layers 14a, 14b and 14c of the gasket 14 also has the squared frame shapes. The second layer 14b as the center layer has an inner periphery which tightly fits with an outer periphery of the separator 11, so that the separator 11 tightly fits with the inner periphery of the squared frame shape of the second layer 14b of the gasket 14. The second layer 14b of the gasket 14 has the same thickness as the separator 11. The second layer 14b of the gasket 14 tightly surrounds the periphery of the separator 11.

The first, second and third layers 14a, 14b and 14c of the gasket 14 have a uniform outer peripheral size which is also the same as the peripheral size of the collectors 11, so that the outside edges of the first, second and third layers 14a, 14b and 14c of the gasket 14 and the collectors 11 are aligned to each other to form vertical and flat side walls of the cell structure 15.

The first and third layers 14a and 14c as the side layers have the same shape and size. Each of the first and third layers 14a and 14c has an outer periphery which is just aligned to the outer periphery of the second layer 14b, thereby forming vertical and flat side walls of the cell structure 15. Each of the first and third layers 14a and 14c has an inner periphery which is positioned inside of the inner periphery of the second layer 14b, so that the inner periphery of each of the first and third layers 14a and 14c is positioned inside of the outer periphery of the separator 11, whereby the first and third layers 14a and 14c are in contact tightly with the outside peripheral regions of the first and second faces of the separator 11.

Further, the inner periphery of each of the first and third layers 14a and 14c has the same size and shape as the outer periphery of each of the polarization electrodes 12, so that the inner periphery of each of the first and third layers 14a and 14c tightly fits with the outer periphery of each of the polarization electrodes 12. The first and third layers 14a and 14c has a uniform thickness which is thicker than the polarization electrodes 12 by the gap between the separator 11 and the polarization electrodes 12. The first and third layers 14a are also in contact tightly with the collectors 13.

The first, second and third layers 14a, 14b and 14c of the gasket 14 may comprise an electrically insulative thermoplastic resin material. This electrically insulative thermoplastic resin material may optionally be the same as the electrically insulative resin base material of the collectors 12. Namely, as described above, the collectors 12 may comprise the carbon-dispersed olefin-based resin material such as the carbon-dispersed styrene-ethylene-butylene-styrene co-polymer resin. The first, second and third layers 14a, 14b and 14c of the gasket 14 may optionally comprise an olefin-based resin material such as a styrene-ethylene-butylene-styrene co-polymer resin. For detecting the leakage of the electrolytic solution, the first, second and third layers 14a, 14b and 14c of the gasket 14 may optionally comprise a transparent electrically insulative material such as a transparent polyolefin based material.

As described above, the laminated first, second and third layers 14a, 14b and 14c of the gasket 14 completely and tightly surround the peripheries of the separator 11 and the paired polarization electrodes 12. The gaskets 14 and the paired polarization electrodes 12 are tightly sandwiched between the paired collectors 13. The electrolytic solution 16 is filled within an inner space 17 of the cell structure 18. The gasket 14 tightly seals the inner space 17 of the cell structure 18. A sulfuric acid solution may be available for the electrolytic solution 16.

The above described cell structure 15 may be formed as follows.

In the first step, activated carbon powders are mixed with a binder and a solvent to prepare a material for the polarization electrodes 12.

In the second step, the material for the polarization electrodes 12 is printed with a predetermined shape and on a predetermined area of each of the collectors 13 which comprise the electrically conductive films, thereby, forming the polarization electrodes 12 on the collectors 13. The polarization electrodes 12 on the collectors 13 are then dried to remove the solvent from them.

In the third step, the electrolytic solution 16 is impregnated into the polarization electrodes 12.

In the fourth step, a pair of the collectors 13 with the polarization electrodes 12 is placed so that the separator 11 is interposed between the polarization electrodes 12 which are also interposed between the collectors 13, and further the gasket 14 is placed so that the gasket 14 surrounds the separator 11 and the polarization electrodes 12 and also that the gasket 14 is sandwiched between the collectors 13. Under a reduced pressure, a predetermined pressure of for example 0.003 Pa is applied to the collectors 13 from the outsides, during which a heat treatment is carried out at a predetermined temperature of 120° C. for a predetermined time of for example 10 seconds, whereby the gasket 14 is sealed with the collectors 13 and also the first, second and third layers 14a, 14b and 14c of the gasket 14 are also sealed with each other. As a result, the cell structure 15 is completed.

Subsequently, the aging process is carried out to the cell structure 15. There are different two aging processes. The first type aging process "A" is the aging process for the single cell structure 15. The second first type aging process "A" is the aging process for a plural-stacked cell structure 20 which comprises plural cell structures 15 which are stacked. Either lone of the first type and second type aging processes is necessary. (first type aging process "A")

In accordance with the first type aging process "A", the single cell structure 15 is applied with a voltage which is not higher than an electrically decomposing voltage which decomposes the electrolytic solution, and also which is not lower than a value defined by division of a working voltage by a stacking number, wherein an electric double layer capacitor 10, which comprises the stacking number of the call structure 15 stacked over each other, works at the working voltage.

In order to determine the temperature and the voltage to be applied for the first type aging process "A", the first type aging process "A" is carried out at various temperatures and applied voltage levels, provided that the time for applying the voltage is fixed at 1 hour. The yield of the cell structure 15 just after the first type aging process "A" is confirmed with reference to 100%. The following table 1 shows the evaluation results of the first type aging process "A".

TABLE 1

|  | Temperature | | | |
| --- | --- | --- | --- | --- |
|  | 25° C. | 60° C. | 85° C. | 100° C. |
| 0(V) |  |  |  |  |
| 0.8(V) | Δ | ○ | ○ |  |
| 0.9(V) | ○ | ◎ | ◎ |  |
| 1.0(V) | ○ | ◎ | ◎ |  |
| 1.1(V) | ○ | ○ | ○ |  |
| 1.2(V) |  |  |  |  |

If the temperature is ranged from 25° C. to 85° C. and the voltage is ranged from 0(V) to 1.1(V), then the yield of 100% is ensured. The long-term reliability; 60° C. −0.8V/cell, 3000 h-evaluation; variation rate "x" of equivalent series resistance, ◎; greatly high-effective; x≦1.220, ○; highly effective; 1.20<x≦1.8, Δ; effective; 1.8<x≦2.5; and; non-effective 2.5<x.

The broad line represents the boundary in yield between 100% and less 100%. The voltage and temperature conditions for obtaining the yield of 100% are surrounded by the broad line, provided that the yield is the yield just after the first type aging process "A" has been carried out.

In case of 100%-yeild of just after the first type aging process "A", at 60° C., the cell structure 15 is applied with a voltage of 0.8V/cell for 3000 hours. The equivalent series resistance of the cell structure 15 is measured both before and after the above voltage application for 3000 hours so as to obtain the variation rate "x" of the equivalent series resistance which corresponds to a difference in the equivalent series resistance between before and after the above voltage application for 3000 hours. The long-term reliability or the degree of stability of the electrical characteristics is evaluated based on the variation rate "x" of the equivalent series resistance. The results of the evaluation on the long-term reliability are also shown on the above table 1.

⊚ represents that the long-term reliability is greatly high, wherein x≦1.20. ○ represents that the long-term reliability is high, wherein 1.20<x≦1.8. Δ represents that the long-term reliability is present, wherein 1.8<x≦2.5. represents that the long-term reliability is absent, wherein 2.5<x.

As shown on the table 1, if the voltage is applied to the single cell structure 15 at 100° C. in the first type aging process "A", then the yields just after the first type aging process "A" are lower than 100% independent from the applied voltage levels. If the applied voltage level is 1.2V, then the yields just after the first type aging process "A" are lower than 100% independent from the temperature.

By contrast, if the voltage of not higher than 1.1V is applied to the single cell structure 15 at a temperature ranged from 25° C. to 85° C., then the yields just after the first type aging process "A" are 100%. In this case of the 100%-yeild, further if the voltage ranged from 0.8V to 1.1V is applied to the single cell structure 15 at the temperature ranged from 25° C. to 85° C., then the long-term reliability can be obtained.

Accordingly, it is preferable for the first type aging process "A" that the voltage ranged from 0.8V to 1.1V is applied to the single cell structure 15 at the temperature ranged from 25° C. to 85° C. for obtaining the greatly high or high long-term reliability. It is more preferable for the first type aging process "A" that the voltage ranged from 0.9V to 1.0V is applied to the single cell structure 15 at the temperature ranged from 60° C. to 85° C. for obtaining the greatly high long-term reliability.

The time of the voltage application in the first type aging process "A" is preferably not shorter than 1 hour and not longer than 15 hours. If the time of the voltage application is over 15 hours, then a large quantity of moisture is emitted from the electrolytic solution of the cell structure 15. In accordance with the above-described first type aging process "A", the voltage of 0.9V is applied to the single cell structure 15 at 60° C. for 1 hour.

After the above-described first type aging process "A" as the fifth step, then in the sixth step, a plurality of the cell structure 15 are stackerd to form a stacked-cell structure 20. A pair of electrode plates 21 with lead-terminals is provided in contact tightly with outside surfaces of the outside collectors 13 of the stacked-cell structure 20. The stacked-cell structure 20 with the electrode plates 21 is then packaged by a package film 22 under a reduced pressure which is lower than the atmospheric pressure.

Each of the above-described electrode plates 21 with the lead-terminals may optionally comprise a solder-plated copper plate. Each of the above-described electrode plates 21 comprises a square-shaped flat plate electrode plate body 24. Each of the lead-terminals comprises a stripe-shaped lead terminal 25 which extends from the square-shaped flat plate electrode plate body 24. The square-shaped flat plate electrode plate body 24 is in contact tightly with the outer surface of the outer collector 13 of the stacked cell structure 20.

The package film 22 may comprise a laminate film structure which further comprises laminations of an aluminum film and an insulative resin film. The outside layer of the laminate film structure is the insulative resin film. The insulative resin film comprises an olefin resin film.

The packaging process corresponds to the seventh process. The electrode plates 21 comprising the electrode plate bodies 24 and the lead terminals 25 are placed so that the electrode plate bodies 24 are in contact tightly with the outer surface of the outside collectors 13 before a heat treatment is carried out at a predetermined temperature of 85° C. for a predetermined time of, for example, 2 hours, whereby the electrode plates 21 with the terminal electrodes are united with the stacked cell structure 20.

The electrode plates 21 with the lead-terminals and the stacked cell structure 20 are packaged by the packaging film 22 under the reduced pressure which is lower than the atmospheric pressure. A peripheral region of the packaging film 22 is thermally sealed for sealing the stacked cell structure 20 by the packaging film 22. As a result, the electric double layer capacitor 10 is completed.

When the electric double layer capacitor 10 is used in the atmospheric pressure, the capacitor 10 always receives a compression force from the outside by the difference between the inside reduced pressure and the outside atmospheric pressure.

In the eighth step, the electric double layer capacitor 10 is inspected.

(Second Type Aging Process "B")

In accordance with the second type aging process "B", a plurality of the cell structure 15 is stacked to form a stacked cell structure 20. The stacked cell structure 20 is applied with a voltage which is not higher than an electrically decomposing voltage which decomposes the electrolytic solution, and also which is not lower than a value defined by division of a working voltage by a stacking number, wherein an electric double layer capacitor 10, which comprises the stacking number of the cell structure 15 stacked over each other, works at the working voltage.

In order to determine the temperature and the voltage to be applied for the second type aging process "B", the second type aging process "B" is carried out at various temperatures and applied voltage levels, provided that the time for applying the voltage is fixed at 1 hour. The yield of the stacked cell structure 20 just after the second type aging process "B" is confirmed with reference to 100%. The following table 2 shows the evaluation results of the second type aging process "B".

TABLE 2

|  | Temperature | | | |
| --- | --- | --- | --- | --- |
|  | 25° C. | 60° C. | 85° C. | 100° C. |
| 0(V/cell) |  |  |  |  |
| 0.8(V/cell) | Δ | ⊚ | ⊚ |  |
| 0.9(V/cell) | ○ | ⊚ | ⊚ |  |
| 1.0(V/cell) | ○ | ⊚ | ⊚ |  |
| 1.1(V/cell) |  |  |  |  |
| 1.2(V/cell) |  |  |  |  |

If the temperature is ranged from 25° C. to 85° C. and the voltage is ranged from 0(V) to 1.0(V), then the yield of 100% is ensured. The long-term reliability; 60° C. −0.8V/cell, 3000 h-evaluation; variation rate "x" of equivalent series resistance, ⊚; greatly high-effective; x≦1.20, ○; highly effective; 1.20<x≦1.8, Δ; effective; 1.8<x≦2.5, and; non-effective 2.5<x.

The broad line represents the boundary in yield between 100% and less 100%. The voltage and temperature conditions for obtaining the yield of 100% are surrounded by the broad line, provided that the yield is the yield just after the second type aging process "B" has been carried out.

In case of 100%-yeild of just after the second type aging process "B", at 60° C., the cell structure 15 is applied with a voltage of 0.8V/cell for 3000 hours. The equivalent series resistance of the cell structure 15 is measured both before and after the above voltage application for 3000 hours so as to obtain the variation rate "x" of the equivalent series resistance which corresponds to a difference in the equivalent series resistance between before and after the above voltage application for 3000 hours. The long-term reliability or the degree of stability of the electrical characteristics is evaluated based on the variation rate "x" of the equivalent series resistance. The results of the evaluation on the long-term reliability are also shown on the above table 2.

⊚ represents that the long-term reliability is greatly high, wherein x<1.20. ○ represents that the long-term reliability is high, wherein 1.20<x≦1.8. Δ represents that the long-term reliability is present, wherein 1.8<x≦2.5. represents that the long-term reliability is absent, wherein 2.5<x.

As shown on the table 2, if the voltage is applied to the plural-stacked cell structure 20 at 100° C. in the second type aging process "B", then the yields just after the second type aging process "B" are lower than 100% independent from the applied voltage levels. If the applied voltage level ifs; not lower than 1.1V/cell, then the yields just after the second type aging process "B" are lower than 100% independent from the temperature.

By contrast, if the voltage of not higher than 1.0V/cell is applied to the plural-stacked cell structure 20, then the yields just after the second type aging process "B" are 100% independent from the temperature. In this case of the 100%-yeild, further if the voltage of not higher than 1.0V/cell is applied to the plural-stacked cell structure 20 at the temperature ranged from 25° C. to 85° C., then the long-term reliability can be obtained.

Accordingly, it is preferable for the second type aging process "B" that the voltage ranged from 0.8V/cell to 1.0V/cell is applied to the plural-stacked cell structure 20 at the temperature ranged from 25° C. to 85° C. for obtaining the greatly high or high long-term reliability. It is more preferable for the second type aging process "B" that the voltage ranged from 0.9V/cell to 1.0V/cell is applied to the plural-stacked cell structure 20 at the temperature ranged from 60° C. to 85° C. for obtaining the greatly high long-term reliability.

The time of the voltage application in the second type aging process "B" is preferably not shorter than 1 hour and not longer than 15 hours. If the time of the voltage application is over 15 hours, then a large quantity of moisture is emitted from the electrolytic solution of the plural-stacked cell structure 20. In accordance with the above-described second type aging process "B", the voltage of 0.9V/cell is applied to the plural-stacked cell structure 20 at 60° C. for 1 hour.

After the above-described second type aging process "B" as the sixth step, then in the seventh step, a pair of electrode plates 21 with lead-terminals is provided in contact tightly with outside surfaces of the outside collectors 13 of the stacked-cell structure 20. The stack-cell structure 20 with the electrode plates 21 is then packaged by a package film 22 under a reduced pressure which is lower than the atmospheric pressure.

Each of the above-described electrode plates 21 with the lead-terminals may optionally comprise a solder-plated copper plate. Each of the above-described electrode plates 21 comprises a square-shaped flat plate electrode plate body 24. Each of the lead-terminals comprises a stripe-shaped lead terminal 25 which extends from the square-shaped flat plate electrode plate body 24. The square-shaped flat plate electrode plate body 24 is in contact tightly with the outer surface of the outer collector 13 of the stacked cell structure 20.

The package film 22 may comprise a laminate film structure which further comprises laminations of an aluminum film and an insulative resin film. The outside layer of the laminate film structure is the insulative resin film. The insulative resin film comprises an olefin resin film.

The packaging process corresponds to the seventh process. The electrode plates 21 comprising the electrode plate bodies 24 and the lead terminals 25 are placed so that the electrode plate bodies 24 are in contact tightly with the outer surface of the outside collectors 13 before a heat treatment is carried out at a predetermined temperature of 85° C. for a predetermined time of, for example, 2 hours, whereby the electrode plates 21 with the terminal electrodes are united with the stacked cell structure 20.

The electrode plates b 21 with the lead-terminals and the stacked cell structure 20 are packaged by the packaging film 22 under the reduced pressure which is lower than the atmospheric pressure. A peripheral region of the packaging film 22 is thermally sealed for sealing the stacked cell structure 20 by the packaging film 22. As a result, the electric double layer capacitor 10 is completed.

When the electric double layer capacitor 10 is used in the atmospheric pressure, the capacitor 10 always receives a compression force from the outside by the difference between the inside reduced pressure and the outside atmospheric pressure.

In the eighth step, the electric double layer capacitor 10 is inspected.

In accordance with the above-described first embodiment, the collectors 13 comprises the material which has the gas permeability coefficient of at least $4.0E-12[m^3/(m^2 \cdot S \cdot Pa)]$. Prior to the sealing process by the package film 22, under the high temperature condition, for example at 60° C., the cell structure 15 is applied with the voltage, for example, 0.9V/cell, which is not higher than an electrically decomposing voltage which decomposes the electrolytic solution 16, and also which is not lower than a value defined by division of a working voltage by a stacking number, wherein an electric double layer capacitor 10, which comprises the stacking number of the cell structure 15 stacked over each other, works at the working voltage. This voltage application generates a gas, for example, carbon dioxide and carbon monoxide.

The generated gas is, however, permeable through the collectors 13 from the interior of the cell structure 15 to the exterior of the cell structure 15. This may prevent any excess accumulation of the generated gas in the cell structure 15, whereby no increase in the equivalent series resistance nor leakage of the electrolytic solution is caused. Accordingly, the above high gas permeability coefficient of at least $4.0E-12[m^3/(m^2 \cdot S \cdot Pa)]$ of the collectors 13 may improve the yield of the electric double layer capacitor 10. Practically, the gas permeability coefficient of the collectors 13 is preferably lower than $9.0E-12[m^3/(m^2 \cdot S \cdot Pa)]$.

In order to investigate the above-described effects, the yields are confirmed under the following conditions in the second type aging process "B". 100 products of the plural-stacked cell structure 20 having the improved collectors 13 and 100 products of the plural-stacked cell structure having the conventional collectors are investigated in the yields, wherein a voltage, of 0.9V/cell is applied for 1 hour at 60° C. Each of the improved collectors 13 comprises the carbon-blended styrene-ethylene-butylene-styrene co-polymer which has the gas permeability coefficient of $4.0E-12 [m^3/(m^2 \cdot S \cdot Pa)]$. Each of the conventional collectors comprises the carbon-blended unvulcanized butyl rubber which has the gas permeability coefficient of $2.0E-12[m^3/(m^2 \cdot S \cdot Pa)]$.

TABLE 3

| | Yield of final products | | | | |
|---|---|---|---|---|---|
| | number | non-defective | defective | yield | ESR | leakage |
| Ex. 1 | 100 | 100 | 0 | 100% | 0 | 0 |
| Com. Ex. | 100 | 90 | 10 | 90% | 6 | 4 |

As shown on the table 3, the yield of the novel electrical double layer (Capacitors in accordance with the first embodiments of the present invention is 100%, wherein all of the novel electrical double layer capacitors are non-defective, and none of the novel electrical double layer capacitors is defective. The yield of the conventional electrical double layer capacitors in accordance with comparative example is 90%, wherein ninety of the conventional electrical double layer capacitors are non-defective, and ten of the novel electrical double layer capacitors are defective.

Further, the non-defective one hundred products of the novel electric double layer capacitors are selected after the following investigation of the yield. Also, the non-defective one hundred products of the conventional electric double layer capacitors are selected after the following investigation of the yield through the second type aging process "B". The voltage of 0.9V/cell is applied for 1 hour at 60° C. Each of the improved collectors 13 comprises the carbon-blended styrene-ethylene-butylene-styrene co-polymer which has the gas permeability coefficient of $4.0E-12[m^3/(m^2 \cdot S \cdot Pa)]$. Each of the conventional collectors comprises the carbon-blended unvulcanized butyl rubber which has the gas permeability coefficient of $2.0E-12[m^3/(m^2 \cdot S \cdot Pa)]$.

Both the non-defective one hundred products of the novel electric double layer capacitors and the non-defective one hundred products of the conventional electric double layer capacitors are subjected to the following test. The voltage of 0.8V/cell is applied at 60° C. for 3000 hours. The results are shown on the following table 4.

TABLE 4

| | Long-term reliability | | | |
|---|---|---|---|---|
| | initial ESR | initial ESC | variation ESR | variation ESC |
| Ex. 1 | 200Ω | 0.200 F | 1.09 times | -5% |
| Com. Ex. | 195Ω | 0.195 F | 2.83 times | -38% |

The "initial ESR" represents the initial value of the equivalent series resistance. The "initial ESC" represents the initial value of the electrostatic capacitance. The "variation ESR" represents the variation of the equivalent series resistance by the above process for applying the voltage of 0.8V/cell at 60° C. for 3000 hours. The "variation ESC" represents the variation of the equivalent series resistance by the above process for applying the voltage of 0.8V/cell at 60° C. for 3000 hours.

As shown on the table 4, the novel electric double layer capacitor shows a small variation rate, for example, 1.09 times of the equivalent series resistance upon the above described high temperature load test. By contrast, the conventional electric double layer capacitor shows a large variation rate, for example, 2.83 times of the equivalent series resistance upon the above described high temperature load test. This means that the above improved collectors 13 having the large gas permeability coefficient is effective to suppress the increase of the equivalent series resistance upon the above described high temperature load test.

As further shown on the table 4, the novel electric double layer capacitor shows a small variation rate, for example—5% of the capacitance upon the above described high temperature load test. By contrast, the conventional electric double layer capacitor shows a large variation rate, for example,—38% of the capacitance upon the above described high temperature load test. This means that the above improved collectors 13 having the large gas permeability coefficient is effective to suppress the decrease of the capacitance upon the above described high temperature load test.

Accordingly, the above described high temperature load test shows that the novel electric double layered capacitor of the first embodiment of the present invention is improved in the long-term reliability as compared to the conventional electric double layered capacitor of the comparative example.

In accordance with the above-described first embodiment, the collectors 13 comprises the gas permeable material which has the high gas permeability coefficient in the range of $4.0E-12[m^3/(m^2 \cdot S \cdot Pa)]$ to $9.0E-12[m^3/(m^2 \cdot S \cdot Pa)]$ for allowing the gas permeation from the internal space of the cell structure to the exterior thereof.

Notwithstanding, it is possible as a modification that at least a part of the collectors 13 comprises the electrically conductive gas permeable material which has the high gas permeability coefficient in the range of $4.0E-12[m^3/(m^2 \cdot S \cdot Pa)]$ to $9.0E-12[m^3/(m^2 \cdot S \cdot Pa)]$ for allowing the gas permeation from the internal space of the cell structure to the exterior thereof.

Further, it is also possible as another modification that in place of the collectors 13, a part or the entirety of the gasket 14 comprises the electrically insulative gas permeable material which has the high gas permeability coefficient in the range of $4.0E-12[m^3/(m^2 \cdot S \cdot Pa)]$ to $9.0E-12[m^3/(m^2 \cdot S \cdot Pa)]$ for allowing the gas permeation from the internal space of the cell structure to the exterior thereof.

Furthermore, it is also possible as still another modification that not only the collectors 13 but also a part or the entirety of the gasket 14 comprise the electrically conductive and electrically insulative gas permeable materials which have the high gas permeability coefficients in the range of $4.0E-12[m^3/(m^2 \cdot S \cdot Pa)]$ to $9.0E-12[m^3/(m^2 \cdot S \cdot Pa)]$ for allowing the gas permeation from the internal space of the cell structure to the exterior thereof.

The base material as the electrically insulative material for the gasket, 14 may be rubbers such as butyl rubber, and ethylenepropylenediene rubber, or plastics such as polypropylene, and polyvinylchloride.

In accordance with the above described first embodiment, the gasket 14 provides the following advantages. The gasket 14 comprises the triple-layered structure, for example, the first, second and third layers 14a, 14b and 14c, wherein the second layer 14b is the center layer interposed between the first and third layers 14a and 14c. The second layer 14b surrounds the periphery of the separator 11, for which reason it is unnecessary that the first and third layers 14a and 14c are deformed to extend around the periphery of the separator 11. This means it unnecessary to largely deform the first and third layers 14a and 14c. This allows narrowing the gap between the separator 11 and each of the polarization electrodes 12. Further, it is unnecessary to apply a high pressure for deforming the first and third layers 14a and 14c. This may prevent any leakage of the electrolytic solution 16. No leakage of the electrolytic solution 16 does not prevent the thermal bonding between the first, second and third layers 14a, 14b and 14c of the gasket 14. Consequently, both the prevention of any leakage of the electrolytic solution 16 and the suppression of the equivalent series resistance can be obtained.

In order to confirm the advantages provided by the above described triple-layered structure of the gasket 14, the following test is made. The novel cell structure having the triple-layered gasket 14 in accordance with the first embodiment of the present invention and the conventional cell structure having the double-layered gasket in the second comparative example are investigated in the equivalent series resistance and the defective rate, under the conditions of various thicknesses of the gasket, a uniform thickness of the separator and a uniform thicknesses of the polarization electrodes. The defective rate is defined to be a ratio of the defective number to the total member, wherein the defective is caused by the leakage of the electrolytic solution. The following table 5 shows the results of the above investigation.

TABLE 5

|  | ESR (mΩ) | defective rate | T(A) (μm) | T(B) (μm) | T(C) (μm) | D = B − C | D/A |
|---|---|---|---|---|---|---|---|
| triple-layer | 20 | 2.0 | 25 | 50 | 45 | 5 | 0.2 |
| structure | 22 | 1.2 | 25 | 60 | 45 | 15 | 0.6 |
| Ex. 1 | 49 | 0.3 | 25 | 70 | 45 | 25 | 1 |
|  | 120 | 0.0 | 25 | 80 | 45 | 35 | 1.4 |
| double-layer | 21 | 50.0 | 25 | 50 | 45 | 5 | 0.2 |
| structure | 24 | 20.0 | 25 | 60 | 45 | 15 | 0.6 |
| Comp. Ex. 2 | 60 | 3.0 | 25 | 70 | 45 | 25 | 1 |
|  | 117 | 0.0 | 25 | 80 | 45 | 35 | 1.4 |

"ESR" represents the equivalent series resistance. "defective rate" Represents the defective rate which is defined to be the ratio of the defective number to the total number. "T(A)" represents the thickness of the separator 11. "T(B)" represents the thickness of each of the first and second layers 14a and 14c of the gasket 14. "T(C)" represents the thickness of the polarization electrode 12. "D=B−C" represents the subtraction of the thickness T(B) of the gasket 14 from the thickness T(C) of the polarization electrode 12. "D/A" represents the division of "D" into "T(A)".

The thickness of the separator 11 is uniform at 25 micrometers. The thickness of the polarization electrode 12 is uniform at 45 micrometers. The respective sizes of the separator 11 and the polarization electrode 12 are not changed by the thermal bonding process. A thickness of the peripheral portion of each of the cell structures is measured by a micro-gage. Another thickness of the center portion of each of the cell structures is also measured by the micro-gage. The thickness T(B) between the collector 13 and the separator 11 is measured. The subtraction "D=B−C" is calculated. The division "D/A" is further calculated.

Figure 3:
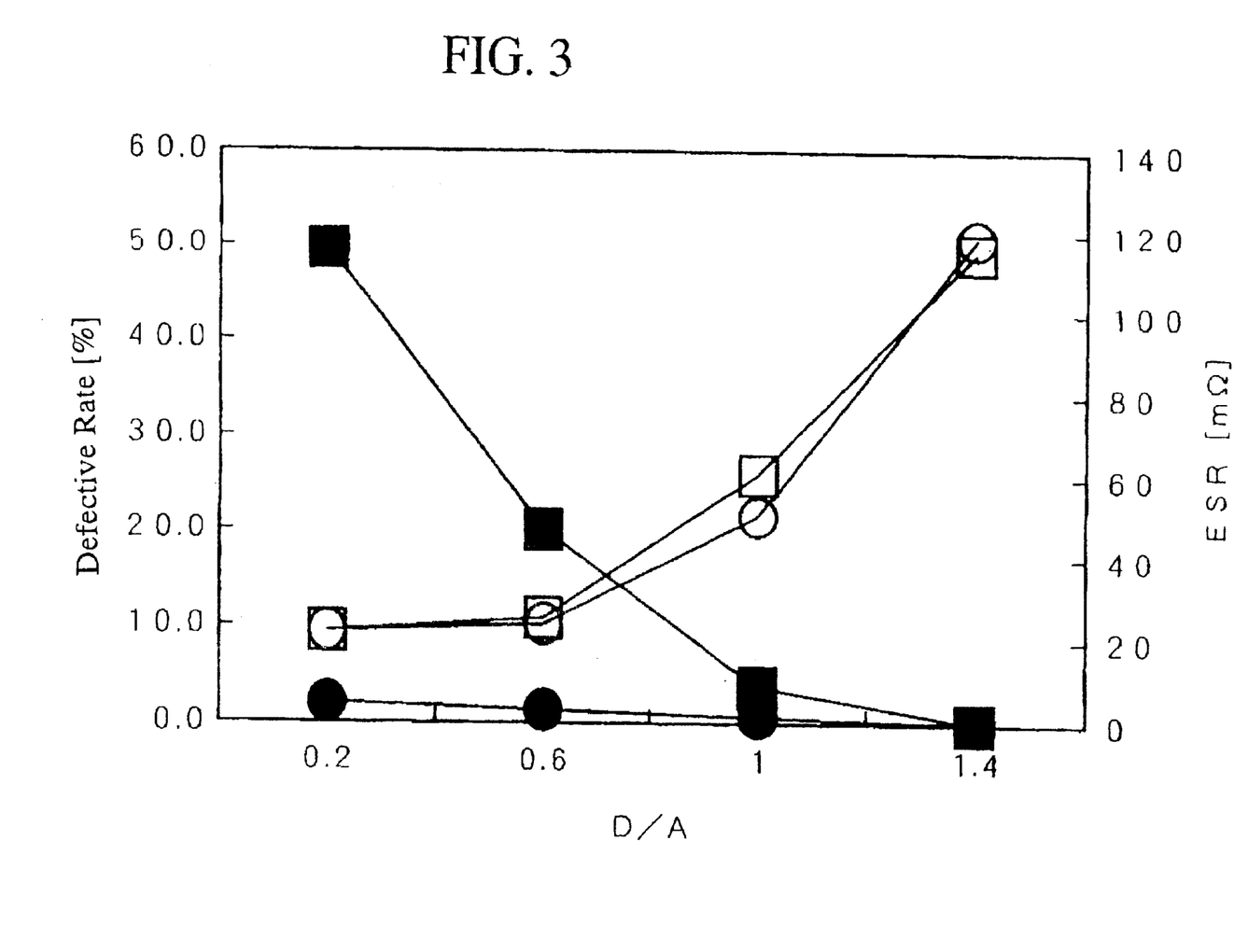
FIG. 3 is a diagram illustrative of respective variations of the defective rate and of the equivalent series resistance over D/A.

FIG. 3 is a diagram illustrative of respective variations of the defective rate and of the equivalent series resistance over D/A. "●" represents the defective rate of the novel cell structure of the first embodiment in accordance with the present invention. "■" represents the defective rate of the conventional cell structure of the second comparative example. "○" represents the equivalent series resistance of the novel cell structure of the first embodiment in accordance with the present invention. "□" Represents the equivalent series resistance of the conventional cell structure of the second comparative example.

In both the novel and conventional cell structures, the equivalent series resistance is increased as "D/A" is increased. The increase of "D/A" means the increase of the gap between the separator 11 and the polarization electrode 12. The increase of the gap causes the increase in the equivalent series resistance.

In the conventional cell structure with the double-layered gasket, as "D/A" is decreased, then the defective rate in connection with the leakage of the electrolytic solution is increased. What "D/A" is small means that the deformation of the gasket is small, whereby the leakage of the electrolytic solution is caused until the double layers of the gasket are thermally bonded. As a result, the leaked electrolytic solution prevents the thermal bonding between the double layers of the gasket. The gasket 14 is likely to be defective.

By contrast, in accordance with the novel cell structure with the triple-layered gasket, the defective rate in connection with the leakage of the electrolytic solution remains almost zero independent from "D/A". The second layer 14b of the triple-layered gasket 14 is in contact tightly with the periphery of the separator 11. This may prevent the leakage of the electrolytic solution and also prevent the thermal bonding between adjacent two of the first, second and third layers 14a, 14b and 14c of the triple-layered gasket 14.

In case of the above-described triple-layered structure, if "D/A" is in the range of 0.2 to 0.6, then the equivalent series resistance (ESR) is well suppressed and also the leakage of the electrolytic solution can be well suppressed. If "D/A" is smaller than 0.2, then this causes an insufficient adhesiveness between adjacent two of the first, second and third layers 14a, 14b and 14c of the triple-layered gasket 14 and also between the triple-layered gasket 14 and each of the collectors 13. If "D/A" is larger than 0.6, then the equivalent series resistance is so high as not preferable.

In accordance with the first embodiment of the present invention, the first, second and third layers 14a, 14b and 14c of the triple-layered gasket 14 comprises the same thermoplastic resin, so that the first, second and third layers 14a, 14b and 14c have the uniform property or characteristic, whereby the first, second and third layers 14a, 14b and 14c are thermally bonded and united to form the substantially united gasket 14.

Figure 4:
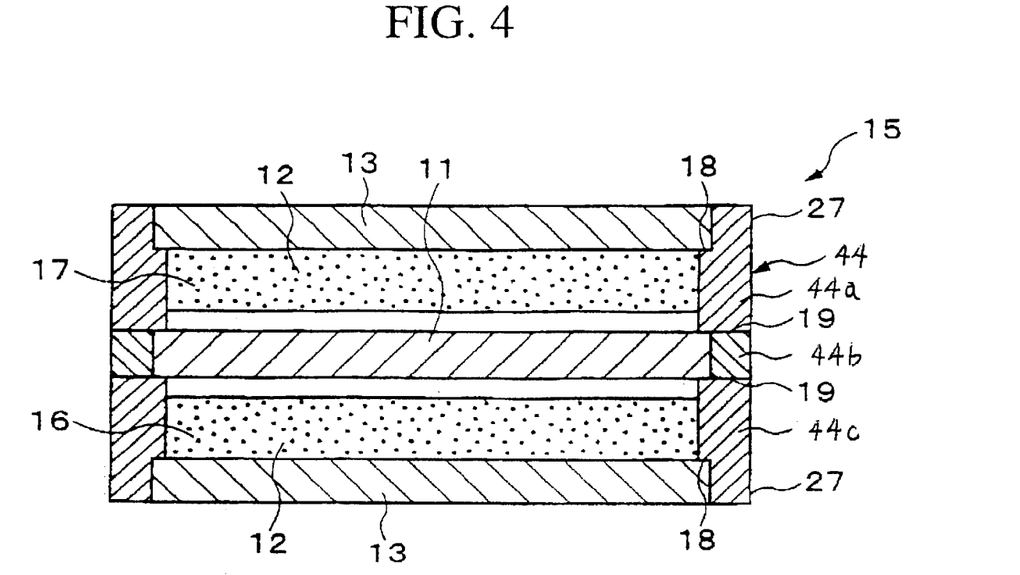
FIG. 4 is a cross sectional elevation view of a modified cell structure for the electric double layer capacitor in accordance with a modification to the first embodiment of the present invention.

The above-described triple-layered gasket 14 may be modified as follows. FIG. 4 is a cross sectional elevation view of a modified cell structure for the electric double layer capacitor in accordance with a modification to the first embodiment of the present invention.

A gasket 44 comprises a triple-layered structure, for example, first, second and third layers 44a, 44b and 44c. The second layer 44b is the center layer which is interposed between the first and third layers 44a and 44c as the side layers. The second layer 44b surrounds the periphery of the separator 11. Each of the first and third layers 44a and 44c surrounds respective peripheries of the polarization electrode 12 and the collector 13. Each of the first and third layers 44a and 44c has an extension which surrounds the periphery of the collector 13. The collector 13 of this modification shown in FIG. 4, has a smaller size than that in the first embodiment shown in FIG. 1.

The gasket 44 provides the same effects and advantages as the gasket 14. The gasket 44 provides the following additional advantage. The extension 27 surrounding the periphery of the collector 13 prevents any formation of a short circuit between the paired collectors 13.

Figure 5:
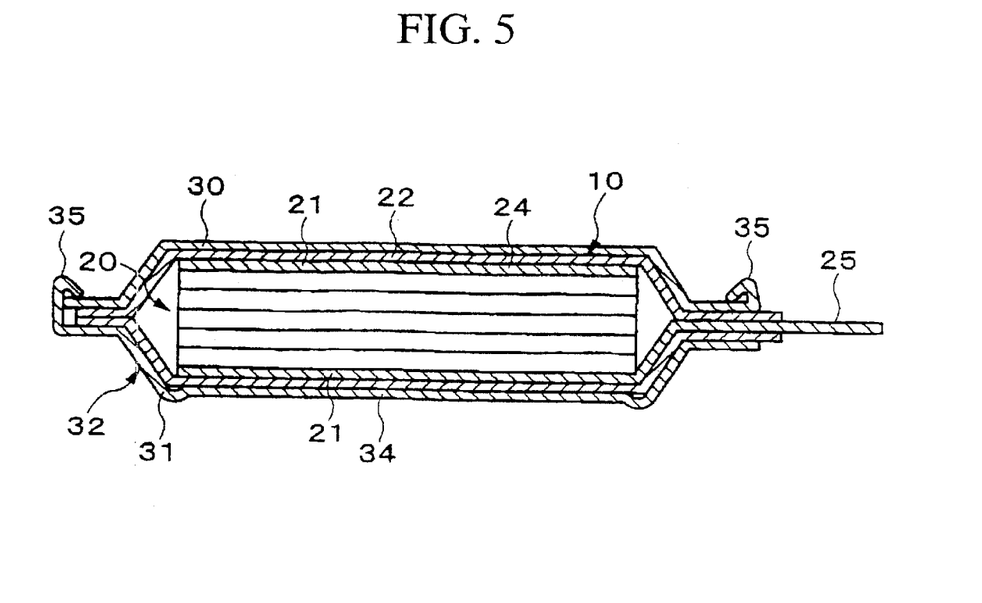
FIG. 5 is a cross sectional elevation view of the electric double layer capacitor of FIG. 1 which is contained in an outer case as another modification.
Figure 6:
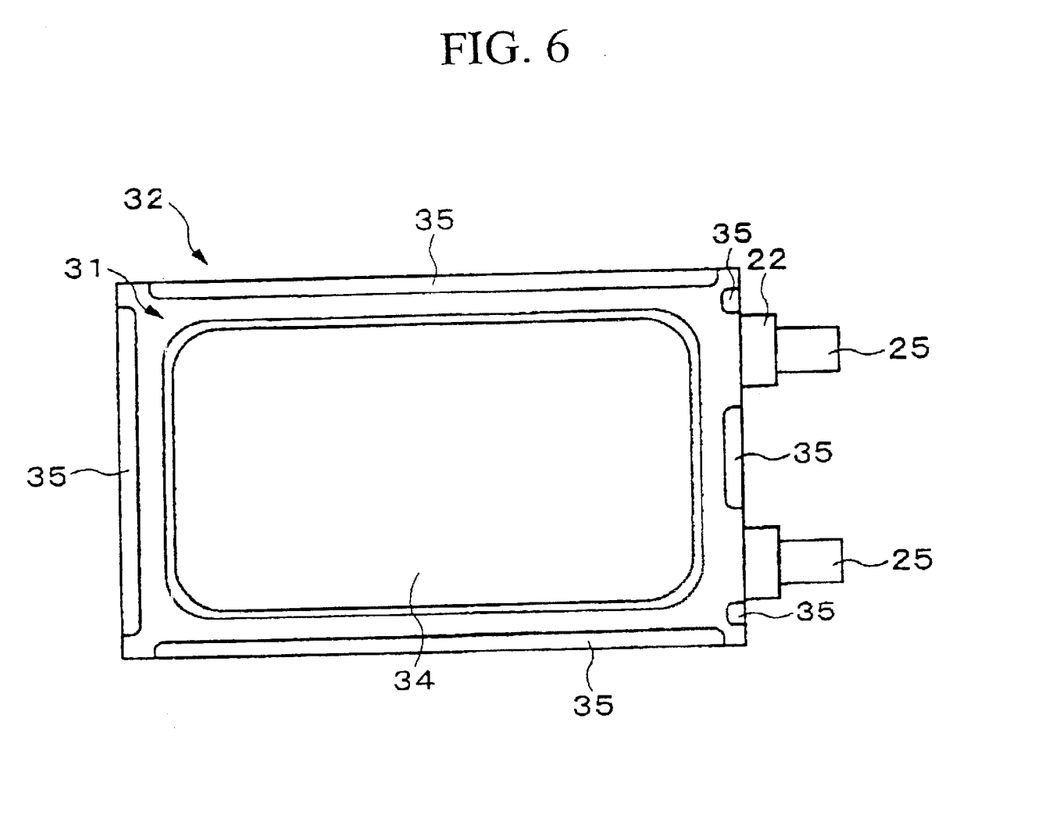
FIG. 6 is a plane view of the outer case of FIG. 5.

FIG. 5 is a cross sectional elevation view of the electric double layer capacitor of FIG. 1 which is contained in an outer case as another modification. FIG. 6 is a plane view of the outer case of FIG. 5.

As described above with reference to FIG. 2, the stacked-cell structure 20 with the electrode plates 21 is packaged by the package film 22. The film-packaged structure is contained in an outer case 32. The outer case 32 comprises an upper case part 30 and a lower case part 31. In the following description, the electric double layer capacitor 10 as packaged by the package film 22 will be referred to as a capacitor body 10.

Each of the upper and lower case parts 30 and 31 may comprise a deformed laminate plate which comprises a stainless thin plate with an insulative resin film. The stainless thin plate is positioned inside, whilst the insulative resin film positioned outside. The insulative resin film may comprise polyethyleneterephthalate or nylon. Each of the upper and lower case parts 30 and 31 has a higher rigidity than the package film 22. The package film 22 is electrically insulative and the stacked-cell structure is enclosed in the electrically insulative package film 22, for which reason it is unnecessary that the inner walls of the upper and lower case parts 30 and 31 are coated with the insulative resin films.

The lower case part 31 has a bottom portion which has a flat-base 34. The flat-base 34 has a peripheral size which is larger than the polarization electrode 12 and smaller than the gasket 14. The periphery of the flat-base 34 is positioned between the inner periphery and the outer periphery of the gasket 14. As a modification, it is possible that the upper case part 30 also has the flat-base.

The capacitor body 10 is positioned over the flat-base 34 of the lower case part 31. The upper case part 30 is combined with the lower case part 31 so that the capacitor body 10 is accommodated in the outer case 32. Upon applying pressures in opposite directions to both the upper and lower case parts 30 and 31, peripheral regions of the upper and, lower case parts 30 and 31 are caulked to form plural caulked portions 35 in the peripheral regions of the upper and lower case parts 30 and 31.

The packaged capacitor body 10 is further contained by the case 32. This allows that the deformable or flexible laminate package is used for the package film 22 for applying the pressure to the stacked cell structure 20 for the purpose of the reduction of the equivalent series resistance, whereas the outer case 32 ensures a sufficiently high mechanical strength or a sufficiently high rigidity. The flat-base 34 may always apply a mechanical pressure to the capacitor body 10, thereby further reducing the equivalent series resistance.

As a modification, it is possible that each of the upper and lower case parts 30 and 31 may comprise a triple layered structure which comprises a stainless steel thin plate, an electrically insulative resin film and an electrically insulative thermoplastic resin. The electrically insulative resin film may comprise an electrically insulative resin such as polyethyleneterephthalate or nylon. The outer surface of the stainless steel thin plate is coated with the electrically insulative resin film, whilst the inner surface thereof is coated with the electrically insulative thermoplastic resin. Since the inside surface of each of the upper and lower case parts 30 and 31 is coated by the electrically insulative thermoplastic film, then the package film 22 comprising the electrically insulative thermoplastic film is not necessary.

It is also possible as a further modification that the gasket may comprise a double layer structure which surrounds the periphery of the separator for obtaining the above-described effects.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A capacitor cell structure comprising:

a separator;

polarization electrodes;

collectors; and a gasket, wherein at least a part of at least either one of said collectors and said gasket has a gas permeability coefficient of at least $4.0E-12[m^3/(m^2 \cdot S \cdot Pa)]$.

2. The capacitor cell structure as claimed in claim 1, wherein said collectors comprises a material having said gas permeability coefficient of at least $4.0E-12[m^3/(m^2 \cdot S \cdot Pa)]$.

3. The capacitor cell structure as claimed in claim 2, wherein said material of said collectors comprises an electrically conductive styrene-ethylene-butylene-styrene co-polymer including dispersion of carbon.

4. The capacitor cell structure as claimed in claim 1, wherein said gasket comprises a material having said gas permeability coefficient of at least $4.0E-12[m^3/(m^2 \cdot S \cdot Pa)]$.

5. The capacitor cell structure as claimed in claim 4, wherein said material of said gasket comprises an electrically conductive styrene-ethylene-butylene-styrene co-polymer including dispersion of carbon.

6. The capacitor cell structure as claimed in claim 1, wherein both said collectors and said gasket comprise a same material having said gas permeability coefficient of at least $4.0E-12[m^3/(m^2 \cdot S \cdot Pa)]$.

7. The capacitor cell structure as claimed in claim 6, wherein said same material comprises an electrically conductive styrene-ethylene-butylene-styrene co-polymer including dispersion of carbon.

8. The capacitor cell structure as claimed in claim 1, wherein said gas permeability coefficient is at most $9.0E-12[m^3/(m^2 \cdot S \cdot Pa)]$.

9. The capacitor cell structure as claimed in claim 1, wherein said gasket comprises a triple layered structure including side layers and a center layer which is interposed between the side layers and said center layer surrounds a periphery of said separator.

10. The capacitor cell structure as claimed in claim 9, wherein each of said side layers surrounds a periphery of said polarization electrode.

11. The capacitor cell structure as claimed in claim 9, wherein each of said side layers surrounds both respective peripheries of said polarization electrode and said collector.

12. An electric double layer capacitor comprising:

a plurality of stacked cell structures, each of said cell structure further comprises: a separator; polarization electrodes; collectors; and a gasket, and a package film which packages said stacked cell structures, wherein at least a part of at least either one of said collectors and said gasket has a gas permeability coefficient of at least $4.0E-12[m^3/(m^2 \cdot S \cdot Pa)]$.

13. The electric double layer capacitor as claimed in claim 12, wherein said collectors comprises a material having said gas permeability coefficient of at least $4.0E-12[m^3/(m^2 \cdot S \cdot Pa)]$.

14. The electric double layer capacitor as claimed in claim 13, wherein said material of said collectors comprises an electrically conductive styrene-ethylene-butylene-styrene co-polymer including dispersion of carbon.

15. The electric double layer capacitor as claimed in claim 12, wherein said gasket comprises a material having said gas permeability coefficient of at least 4.0E-12[$m^3$/($m^2 \cdot S \cdot Pa$)].

16. The electric double layer capacitor as claimed in claim 15, wherein said material of said gasket comprises an electrically conductive styrene-ethylene-butylene-styrene co-polymer including dispersion of carbon.

17. The electric double layer capacitor as claimed in claim 12, wherein both said collectors and said gasket comprise a same material having said gas permeability coefficient of at least 4.0E-12[$m^3$/($m^2 \cdot S \cdot Pa$)].

18. The electric double layer capacitor as claimed in claim 17, wherein said same material comprises an electrically conductive styrene-ethylene-butylene-styrene co-polymer including dispersion of carbon.

19. The electric double layer capacitor as claimed in claim 12, wherein said gas permeability coefficient is at most 9.0E-12[$m^3$/($m^2 \cdot S \cdot Pa$)].

20. The electric double layer capacitor as claimed in claim 12, wherein said gasket comprises a triple layered structure including side layers and a center layer which is interposed between the side layers and said center layer surrounds a periphery of said separator.

21. The electric double layer capacitor as claimed in claim 20, wherein each of said side layers surrounds a periphery of said polarization electrode.

22. The electric double layer capacitor as claimed in claim 20, wherein each of said side layers surrounds both respective peripheries of said polarization electrode and said collector.

23. The electric double layer capacitor as claimed in claim 12, wherein said package film comprises an electrically insulative thermoplastic resin film.

24. An electric double layer capacitor comprising:
a plurality of stacked cell structures, each of said cell structure further comprises: a separator; polarization electrodes; collectors; and a gasket, and
an outer case which contains said stacked cell structures,
wherein at least a part of at least either one of said collectors and said gasket has a gas permeability coefficient of at least 4.0E-12[$m^3$/($m^2 \cdot S \cdot Pa$)].

25. The electric double layer capacitor as claimed in claim 24, wherein said collectors comprises a material having said gas permeability coefficient of at least 4.0E-12[$m^3$/($m^2 \cdot S \cdot Pa$)].

26. The electric double layer capacitor as claimed in claim 25, wherein said material of said collectors comprises an electrically conductive styrene-ethylene-butylene-styrene co-polymer including dispersion of carbon.

27. The electric double layer capacitor as claimed in claim 24, wherein said gasket comprises a material having said gas permeability coefficient of at least 4.0E-12[$m^3$/($m^2 \cdot S \cdot Pa$)].

28. The electric double layer capacitor as claimed in claim 27, wherein said material of said gasket comprises an electrically conductive styrene-ethylene-butylene-styrene co-polymer including dispersion of carbon.

29. The electric double layer capacitor as claimed in claim 24, wherein both said collectors and said gasket comprise a same material having said gas permeability coefficient of at least 4.0E-12[$m^3$/($m^2 \cdot S \cdot Pa$)].

30. The electric double layer capacitor as claimed in claim 29, wherein said same material comprises an electrically conductive styrene-ethylene-butylene-styrene co-polymer including dispersion of carbon.

31. The electric double layer capacitor as claimed in claim 24, wherein said gas permeability coefficient is at most 9.0E-12[$m^3$/($m^2 \cdot S \cdot Pa$)].

32. The electric double layer capacitor as claimed in claim 24, wherein said gasket comprises a triple layered structure including side layers and a center layer which is interposed between the side layers and said center layer surrounds a periphery of said separator.

33. The electric double layer capacitor as claim in claim 32, wherein each of said side layers surrounds a periphery of said polarization electrode.

34. The electric double layer capacitor as claimed in claim 32, wherein each of said side layers surrounds both respective peripheries of said polarization electrode and said collector.

35. The electric double layer capacitor as claimed in claim 24, wherein said outer case has an outside surface which is coated with an electrically insulative resin film.

36. The electric double layer capacitor as claimed in claim 24, wherein said outer case has an inside surface which is coated with an electrically insulative thermoplastic resin film.

37. The electric double layer capacitor as claimed in claim 24, further comprising a package film which packages said stacked cell structure.

38. The electric double layer capacitor as claimed in claim 37, wherein said package film comprises an electrically insulative thermoplastic resin film.

* * * * *